(12) United States Patent
Xie

(10) Patent No.: US 10,621,224 B2
(45) Date of Patent: Apr. 14, 2020

(54) METHOD FOR AUTOMATICALLY NAMING PHOTOS BASED ON MOBILE TERMINAL, SYSTEM, AND MOBILE TERMINAL

(71) Applicant: HUIZHOU TCL MOBILE COMMUNICATION CO., LTD., Huizhou, Guangdong (CN)

(72) Inventor: Fang Xie, Huizhou (CN)

(73) Assignee: HUIZHOU TCL MOBILE COMMUNICATION CO., LTD., Huizhou, Guangdong (CN)

( * ) Notice: Subject to any disclaimer, the term of this patent is extended or adjusted under 35 U.S.C. 154(b) by 375 days.

(21) Appl. No.: 15/541,418

(22) PCT Filed: Jul. 29, 2016

(86) PCT No.: PCT/CN2016/092340
§ 371 (c)(1),
(2) Date: Jul. 3, 2017

(87) PCT Pub. No.: WO2017/101457
PCT Pub. Date: Jun. 22, 2017

(65) Prior Publication Data
US 2018/0004741 A1   Jan. 4, 2018

(30) Foreign Application Priority Data

Dec. 17, 2015  (CN) .......................... 2015 1 0948127

(51) Int. Cl.
*G06F 16/51* (2019.01)
*G06F 16/54* (2019.01)
(Continued)

(52) U.S. Cl.
CPC .......... *G06F 16/51* (2019.01); *G06F 16/2379* (2019.01); *G06F 16/27* (2019.01); *G06F 16/54* (2019.01); *G06F 16/5866* (2019.01)

(58) Field of Classification Search
CPC .......... G06F 16/51; G06F 16/27; G06F 16/54; G06F 16/2379; G06F 16/5866
(Continued)

(56) References Cited

U.S. PATENT DOCUMENTS 6,657,661 B1 * 12/2003 Cazier ................ H04N 1/00127
                                                          348/231.2
8,285,760 B1 * 10/2012 Sina ..................... G06F 16/5866
                                                          707/824
(Continued)

FOREIGN PATENT DOCUMENTS

CN          1671661 A        9/2005
CN       101645031 A   *    2/2010
(Continued)

OTHER PUBLICATIONS

Emil Protalinski, "Gmail will now automatically add Google Calendar events for emails with flight, hotel, restaurant, or ticket info", Aug. 25, 2015, 14 pages, accessed online at venturebeat.com website on Sep. 9, 2019. (Year: 2015).*
(Continued)

*Primary Examiner* — Phuong Thao Cao

(57) ABSTRACT

A method for automatically naming photos based on a mobile terminal, a system, and a mobile terminal are proposed. The method includes presetting a photo naming rule and storing the photo naming rule in the mobile terminal; updating, in real-time, calendar information of a naming resource provided in the mobile terminal; and searching for the naming resource corresponding to a current time from the calendar information when a new photo is detected to be stored, automatically naming the new photo according to the preset naming rule, and storing the named photo in a specific category.

8 Claims, 3 Drawing Sheets

(51) Int. Cl.
*G06F 16/58* (2019.01)
*G06F 16/27* (2019.01)
*G06F 16/23* (2019.01)

(58) Field of Classification Search
USPC .......................................................... 707/610
See application file for complete search history.

(56) References Cited

U.S. PATENT DOCUMENTS

| | | | | |
|---|---|---|---|---|
| 9,128,939 | B2* | 9/2015 | Kinsella | G06F 16/164 |
| 9,349,077 | B2* | 5/2016 | Capuozzo | G06K 9/00677 |
| 9,582,546 | B2* | 2/2017 | Hartford | G06F 16/24578 |
| 9,665,598 | B2* | 5/2017 | Cho | H04M 1/27455 |
| 2002/0080392 | A1* | 6/2002 | Parvulescu | G06F 19/321 358/1.15 |
| 2003/0151767 | A1* | 8/2003 | Habuta | G06Q 30/0601 358/1.15 |
| 2005/0134703 | A1* | 6/2005 | Mittal | H04N 1/32128 348/231.2 |
| 2006/0074992 | A1* | 4/2006 | Kim | H04N 1/21 |
| 2006/0097988 | A1* | 5/2006 | Hong | H04N 1/00307 345/168 |
| 2006/0161635 | A1* | 7/2006 | Lamkin | G06F 16/4387 709/217 |
| 2007/0027911 | A1* | 2/2007 | Hakala | G06F 16/50 |
| 2007/0276883 | A1* | 11/2007 | Kumar | G06F 11/3495 |
| 2007/0294273 | A1* | 12/2007 | Bendeck | G06F 16/68 |
| 2007/0298816 | A1* | 12/2007 | Chu | G06F 16/58 455/456.6 |
| 2008/0133526 | A1* | 6/2008 | Haitani | G06F 16/58 |
| 2008/0177766 | A1* | 7/2008 | Park | H04N 1/32358 |
| 2009/0119608 | A1* | 5/2009 | Huskey | G06F 16/58 715/764 |
| 2009/0171564 | A1* | 7/2009 | Wu | G01C 21/3647 701/533 |
| 2009/0291669 | A1* | 11/2009 | Choi | H04N 1/21 455/412.1 |
| 2010/0029326 | A1* | 2/2010 | Bergstrom | G11B 27/11 455/556.1 |
| 2011/0004503 | A1* | 1/2011 | Farrell | G06Q 10/109 705/7.18 |
| 2011/0022958 | A1* | 1/2011 | Kang | G06F 9/451 715/716 |
| 2011/0053570 | A1* | 3/2011 | Song | H04M 1/27455 455/414.1 |
| 2011/0081952 | A1* | 4/2011 | Song | H04N 1/00307 455/566 |
| 2011/0099199 | A1* | 4/2011 | Stalenhoef | H04N 1/32128 707/770 |
| 2011/0106892 | A1* | 5/2011 | Nelson | G06Q 10/109 709/206 |
| 2011/0125545 | A1* | 5/2011 | Lehmann | G06Q 10/06314 705/7.24 |
| 2012/0096376 | A1* | 4/2012 | Hibi | G06F 3/03545 715/765 |
| 2012/0124079 | A1* | 5/2012 | Kinsella | G06F 16/164 707/769 |
| 2012/0155832 | A1* | 6/2012 | Miyajima | G11B 27/10 386/240 |
| 2013/0139108 | A1* | 5/2013 | Choi | G06F 3/0482 715/823 |
| 2013/0151523 | A1* | 6/2013 | Hsi | G06F 16/51 707/737 |
| 2013/0304733 | A1* | 11/2013 | Kim | G11B 27/28 707/736 |
| 2013/0346068 | A1* | 12/2013 | Solem | G06F 16/5866 704/9 |
| 2014/0129983 | A1* | 5/2014 | McIntyre | G06F 3/0482 715/810 |
| 2014/0237380 | A1* | 8/2014 | Kurrus | H04L 65/403 715/752 |
| 2014/0258297 | A1* | 9/2014 | Davari | G06F 16/58 707/737 |
| 2015/0193391 | A1* | 7/2015 | Khvostichenko | G06Q 10/00 715/205 |
| 2015/0242440 | A1* | 8/2015 | Zombo | G06T 3/0056 382/305 |
| 2015/0347534 | A1* | 12/2015 | Gross | H04L 51/046 707/722 |
| 2015/0347985 | A1* | 12/2015 | Gross | G06F 16/2379 705/7.19 |
| 2016/0119576 | A1* | 4/2016 | Takeda | H04N 5/772 348/220.1 |
| 2016/0182762 | A1* | 6/2016 | Eum | H04N 1/4413 358/1.14 |
| 2016/0188647 | A1* | 6/2016 | Chang | G06F 16/122 707/805 |
| 2016/0267089 | A1* | 9/2016 | Striegel | G06F 16/444 |
| 2016/0360336 | A1* | 12/2016 | Gross | H04W 4/025 |
| 2017/0004220 | A1* | 1/2017 | Quintero | G06F 3/0482 |

FOREIGN PATENT DOCUMENTS

| | | | | |
|---|---|---|---|---|
| CN | 102202173 | A | | 9/2011 |
| CN | 102687146 | A | | 9/2012 |
| CN | 103259915 | A | * | 8/2013 |
| CN | 103259915 | A | | 8/2013 |
| CN | 104850558 | A | | 8/2015 |
| CN | 105574167 | A | | 5/2016 |
| KR | 100690739 | B1 | * | 3/2007 |
| WO | WO-2005024681 | A1 | * | 3/2005 ............ G06F 16/50 |

OTHER PUBLICATIONS

Matt Swain, "Automatically creating Calendar events when receiving email", Apr. 6, 2014, 5 pages, accessed online at <http://www.macosxtips.co.uk/index_files/automatically-create-calendar-events-when-receiving-mail.php> on Sep. 9, 2019. (Year: 2014).*

Matt Swain, Automatically create Calendar events when receiving email, web article, Apr. 6, 2014, 4 pages, Mac OS X Tips, the USA.

Emil Protalinski, Gmail will now automatically add Google Calendar events for emails with flight, hotel, restaurant, or ticket info, web article, Aug. 25, 2015, 4 pages, VentureBeat, the USA.

* cited by examiner

METHOD FOR AUTOMATICALLY NAMING PHOTOS BASED ON MOBILE TERMINAL, SYSTEM, AND MOBILE TERMINAL

CROSS REFERENCE TO RELATED APPLICATION

This application claims the priority of International Application No. PCT/CN2016/092340, filed Jul. 29, 2016, titled "METHOD FOR AUTOMATICALLY NAMING PHOTOS BASED ON MOBILE TERMINAL, SYSTEM, AND MOBILE TERMINAL", which claims priority to Chinese Application No. 201510948127.0 filed on Dec. 17, 2015. The entire disclosures of each of the applications are incorporated herein by reference.

BACKGROUND

1. Field of the Disclosure

The present disclosure relates to a mobile terminal technology, and more specifically, to a method for automatically naming photos based on a mobile terminal, a system, and a mobile terminal.

2. Description

With development of mobile communication and continuous improvement of living standards, various types of mobile terminals such as cell phones grow more and more popular. The cell phones have become an indispensable communication tool in human lives.

In the existing skills, the cell phones are equipped with more and more functions. An audio function is one of the frequently used functions on the mobile terminals.

Almost everyone can perceive a feeling described by one word "disorder" in opening a camera file folder in a cell phone or a digital camera. All the photos taken by using ANDROID or APPLE system are piled up in the camera file folder without any distinction as long as they are unsorted. Of course, it can be understood as a sort of unity. However, an accompanying problem is that it seems that there is no other way except for checking attribute data of the photos one by one so as to distinguish when the photos are taken if the file folder "camera" is not organized for several months. Indeed, organizing so much photos is not really a small project. That is, the photos are named in an irregular way in the existing mobile terminals, it is troublesome to find the photos, and this brings inconvenience for users.

Therefore, there is a need to develop and improve the existing skills.

SUMMARY OF THE DISCLOSURE

The technical problems to be solved in the present disclosure are to provide a method for automatically naming photos based on a mobile terminal, a system, and a mobile terminal for overcoming the above-mentioned disadvantages in the existing skills. The method for automatically naming the currently taken photos is provided with a quick way and is reliable, and provides convenience for the user.

The technical schemes of the present disclosure adopted for solving the technical problems are illustrated hereunder.

A method for automatically naming photos based on a mobile terminal, comprising:

A. presetting a photo naming rule and storing the photo naming rule in the mobile terminal, the photo naming rule comprising time, events, and/or weather or their combinations;

B. updating, in real-time, calendar information of a naming resource provided in the mobile terminal; and C. searching for the naming resource corresponding to a current time from the calendar information when a new photo is detected to be stored, automatically naming the new photo according to the preset naming rule, and storing the named photo in a specific category.

In the method for automatically naming photos based on the mobile terminal, before step A, the method further comprises:

S. presetting an operational menu on the mobile terminal used to browse the stored photos by category.

In the method for automatically naming photos based on the mobile terminal, the operational menu with a category view in step S comprises a time category sub-menu categorized according to time, an event category sub-menu categorized according to events, and a weather category sub-menu categorized according to the weather.

In the method for automatically naming photos based on the mobile terminal, after step C, the method further comprises:

D. receiving an operational instruction from the user to select a corresponding category sub-menu to browse the photos by category in viewing the photos.

In the method for automatically naming photos based on the mobile terminal, the naming resource comprises time information, work content information, life category information, and/or weather information.

In the method for automatically naming photos based on the mobile terminal, step B comprises:

resolving a short message or email information received by the mobile terminal, obtaining information related to the naming resource from an email or a message in a specific format, and automatically synchronizing the information with the calendar information.

In the method for automatically naming photos based on the mobile terminal, step D comprises:

D1. receiving the operational instruction from the user in viewing the photos to select to-be-viewed photos taken on a certain day, in a certain weather, or of a certain travel, using a regular expression for pattern match, and automatically displaying matched photos.

A system for automatically naming photos based on a mobile terminal, comprising:

a presetting module configured to preset a photo naming rule and storing the photo naming rule in the mobile terminal;

a naming resource updating module configured to update, in real-time, calendar information of a naming resource provided in the mobile terminal; and a naming controlling module configured to search for the naming resource corresponding to a current time from the calendar information when a new photo is detected to be stored, automatically name the new photo according to the preset naming rule, and store the named photo in a specific category.

In the system for automatically naming photos based on the mobile terminal, the system further comprises:

a menu setting module configured to preset an operational menu on the mobile terminal used to browse the stored photos by category, the operational menu with a category view comprising a time category sub-menu categorized according to time, an event category sub-menu categorized according to events, and a weather category sub-menu categorized according to the weather.

In the system for automatically naming photos based on the mobile terminal, the system further comprises:

a browsing controlling module configured to receive an operational instruction from the user to select a corresponding category sub-menu to browse the photos by category in viewing the photos.

In the system for automatically naming photos based on the mobile terminal, the system further comprises:

a resolving module configured to resolve a short message or email information received by the mobile terminal, obtain information related to the naming resource from an email or a message in a specific format, and automatically synchronize the information with the calendar information.

In the system for automatically naming photos based on the mobile terminal, the system further comprises:

a selecting and pattern matching module configured to receive the operational instruction from the user in viewing the photos to select to-be-viewed photos taken on a certain day, in a certain weather, or of a certain travel, use a regular expression for pattern match, and automatically display matched photos.

In the system for automatically naming photos based on the mobile terminal, the naming resource comprises time information, work content information, life category information, and/or weather information.

A mobile terminal, comprising a system for automatically naming photos based on a mobile terminal, the system for automatically naming the photos comprising:

a presetting module configured to preset a photo naming rule and storing the photo naming rule in the mobile terminal;

a naming resource updating module configured to update, in real-time, calendar information of a naming resource provided in the mobile terminal; and a naming controlling module configured to search for the naming resource corresponding to a current time from the calendar information when a new photo is detected to be stored, automatically name the new photo according to the preset naming rule, and store the named photo in a specific category.

In the mobile terminal, the system for automatically naming the photos further comprises:

a menu setting module configured to preset an operational menu on the mobile terminal used to browse the stored photos by category, the operational menu with a category view comprising a time category sub-menu categorized according to time, an event category sub-menu categorized according to events, and a weather category sub-menu categorized according to the weather.

In the mobile terminal, the system for automatically naming the photos further comprises:

a browsing controlling module configured to receive an operational instruction from the user to select a corresponding category sub-menu to browse the photos by category in viewing the photos.

In the mobile terminal, the system for automatically naming the photos further comprises:

a selecting and pattern matching module configured to receive the operational instruction from the user in viewing the photos to select to-be-viewed photos taken on a certain day, in a certain weather, or of a certain travel, use a regular expression for pattern match, and automatically display matched photos.

In the mobile terminal, the system for automatically naming the photos further comprises:

a resolving module configured to resolve a short message or email information received by the mobile terminal, obtain information related to the naming resource from an email or a message in a specific format, and automatically synchronize the information with the calendar information.

In the mobile terminal, the naming resource comprises time information, work content information, life category information, and/or weather information.

The method for automatically naming photos based on a mobile terminal, the system, and the mobile terminal provided in the present disclosure add a new function for the mobile terminal. Currently taken photos may be automatically named according to calendar information of a device. The mobile terminal of the present disclosure can carry out automatic classification of photos in the beginning the photos are taken, and carry out recording sufficient and abundant information. The naming and classification are automatically carried out without the need of excessive human operation. The mobile terminal is simple in operation, is easy to be carried out, and provides convenience for the user.

DETAILED DESCRIPTION

A method for automatically naming photos based on a mobile terminal, a system, and a mobile terminal are provided in the present disclosure. In order to describe the objective, the technical scheme, and the advantage of the present disclosure more clearly and definitely, the present disclosure will be further detailed by using embodiments with reference to the appending drawings. It should be understood that the embodiments described herein are only used for illustrating the present disclosure, and the present disclosure is not limited thereto.

Figure 1:
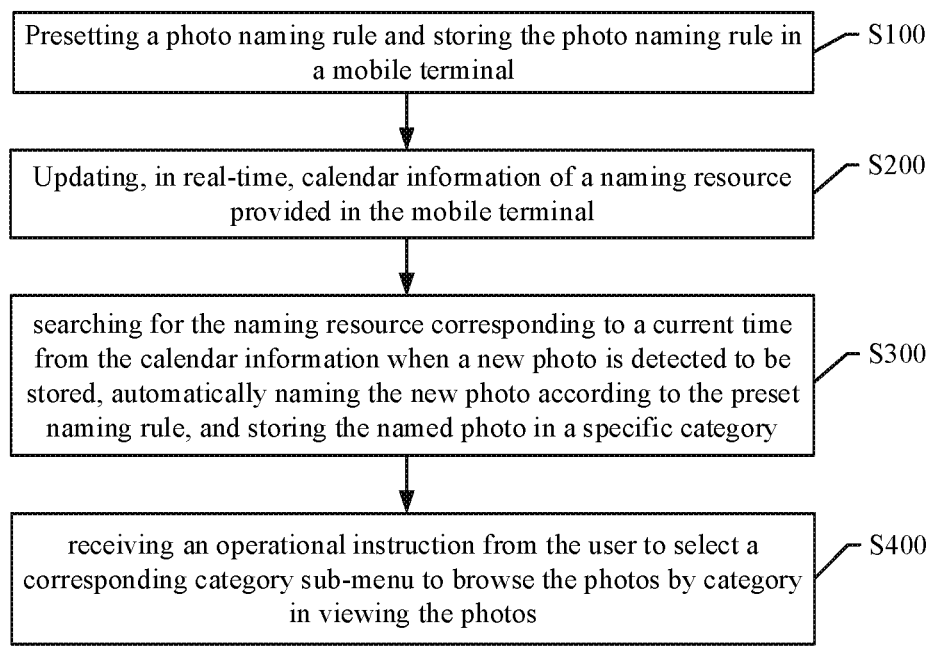
FIG. 1 is a flowchart of a method for automatically naming photos based on a mobile terminal in accordance with a preferred embodiment of the present disclosure.

FIG. 1 is a flowchart of a method for automatically naming photos based on a mobile terminal in accordance with a preferred embodiment of the present disclosure. The method shown in FIG. 1 includes the following step(s).

Step S100—presetting a photo naming rule and storing the photo naming rule in the mobile terminal.

In the embodiment of the present disclosure, it is required to preset a photo naming rule and store the photo naming rule in the mobile terminal. For example, the photo naming rule is set by time information plus work content information (or life category information) plus weather information. Of course, other naming rules are also implementable.

Furthermore, before step S100, the method for automatically naming photos based on the mobile terminal further includes the following step(s).

One step is presetting an operational menu on the mobile terminal used to browse the stored photos by category. The operational menu with a category view includes a time category sub-menu categorized according to time, an event category sub-menu categorized according to events, and a weather category sub-menu categorized according to the weather.

In this way, in the embodiment of the present disclosure, a customized interface can be automatically set for a user, and the system can provide default settings for the user. For example, information that is expected to be included in automatically naming the photos may include date, time, working/nonworking, flight, and railway information. Then, a menu is provided for the user to check by oneself.

In this system, the system can name the photos in a specific manner.

For example, in an embodiment, an interface function for determining which information is included in a name may be provided as below.

```
Bool IsDateReq ( );
Bool IsTimeReq ( );
Bool IsFlightReq ( );
... ...
```

Based on the aforesaid interface, which information is required may be determined, such as:

```
If (IsDateReq ( ) )
{
CopeToTempname(GetDate ( ) );
}
```

The function IsDateReq ( ) is used to determine whether date information is within customization made by the user. If so, the information obtained by the function GetDate ( ) is copied to a temporary name variable, namely this is what the function CopeToTempname ( ) does.

Note that the afore-described method is merely illustrated as an example, and the present disclosure is not limited to specific codes.

Step S200—updating, in real-time every day, calendar information of a resource provided in the mobile terminal for naming the photos.

The resource for naming the photos may include time information, work content information, life category information, and/or weather information.

In the present disclosure, it is required to resolve a short message or email information received by the mobile terminal. For an email or message in a specific format, it is resolved in a specific manner so as to obtain a useful resource for the naming, which is then automatically synchronized with the calendar information.

Taking an ANDROID phone for example, a corresponding resource for the naming can be counted and extracted into the calendar information in the present disclosure. How to synchronize the useful information obtained from other modules with the calendar information is illustrated below. For example, a synchronization between a reservation system and the calendar information is described below.

There are many approaches for the synchronization. For example, the reservation system sends a message to a user via the user's email or a short message after the reservation is successful. For the email or message in such a specific format, the contained useful information can be obtained as long as a targeted resolution is carried out.

Taking Air China for example, its reminder message is generally formatted as follows:

[China Civil Aviation Information] XX (airline industry), Flight XX/on XX Day XX Month/from XX terminal, XX airport, at XX time to XX terminal, XX airport, at XX time. Please board on time/at the gate of XX number.

To resolve such a short message, the keyword "[China Civil Aviation Information]" can be determined to be an airline industry. Then, the message "Flight XX/on XX Day XX Month/from XX terminal, XX airport, at XX time to XX terminal, XX airport, at XX time" is extracted so as to fill an event of a specific time and location into a specific range of time. That is, the calendar information is updated.

Of course, in order to avoid misoperation in modifying the calendar, a confirmation made by the user may be required before the synchronization. The synchronization with the calendar is automatically carried out when agreed by the user.

Specifically, the functional interfaces can be defined as below.

```
Resolution of Email:
Bool IsCalendarRelated (Message);
Time * GetTime (Message);
Event * GetEvent (Message);
... ...
```

The result is synchronized with the calendar as below.
Null UpdateCalendar(Time*GetTime ( ), Event*GetEvent( ), . . . . . . );

Note that the afore-described method is merely illustrated as an example, and the present disclosure is not limited to specific codes.

That is, the calendar information (calendar module) is a core of the present disclosure. Its primary job is to offer sufficient resources for the mobile terminal in naming the photos such that the photo (picture) naming can automatically come out with useful names to name the photos. Also, it is convenient for the user to use different filtering rules to filter out the desired photos according to these pieces of information in browsing the photos. The resources of the calendar information (calendar module) may be a lot number. These resources can be simply classified into two types, that is, that are automatically acquired and manually set.

There is a plenty of information that is acquired automatically. For example, time is the first one to be discussed. A common calendar can be simplified into work days and free days according to the user's living habits. As to the work days, everyday's work-and-rest schedule is basically the same, for example, the wake-up time, the breakfast time, the working hours, the bedtime, and so on. A device can also be synchronized with the user's work calendar for a part of work schedules, for example, a meeting agenda. It also includes an on-line reservation information, for example, flight information, weather conditions, and so on. The free days have similar situations.

The primary difference between the manually set information and the automatically acquired information is that as to the manually set information, the user updates, in light of actual conditions, the calendar obtained according to the automatically acquired information, for example, a modification of the meeting, some other information not synchronized yet, and so on.

In the presence of these pieces of information, it means that the user has made a plan for short-term activities. Thus, the naming module can name the photos taken by itself, according to such abundant inputs.

Step S300—searching for a naming resource corresponding to a current time from the calendar information when a new photo is detected to be stored, automatically naming the new photo according to a preset naming rule, and storing the named photo in a specific category.

In the embodiment of the present disclosure, when a new photo is detected to be stored, the calendar information is searched for obtaining a naming resource corresponding to a current time, the new photo is automatically named according to a preset naming rule, and the named photo is stored in a specific category.

For example, Sunday, Dec. 13, 2015 is shown in a current calendar information. Also, a flight information inserted into the calendar information, acquired from a short message by using the aforesaid steps, is that: "[China Civil Aviation Information]" indicates a certain airline industry, and then the message "Flight XX/on XX Day XX Month/from XX terminal, XX airport, at XX time to XX terminal, XX airport, at XX time" is extracted so as to fill an event of a specific time and location into a specific range of time. Then, the photo taken by the mobile terminal at this moment is named as XX airport on Sunday, Dec. 13, 2015.

In the present disclosure, a device equipped with a function of automatic photo categorization will automatically call for a naming resource corresponding to a current time from the calendar information in taking photos, and name the taken photos according to a preset naming rule.

Before this step, "material" for the naming has already prepared in the calendar information, for example, a related information the user treats as a default, manually sets, or allows to be automatically acquired during each time period every day. Please refer to the afore-described calendar information for details. In short, a photographing process will automatically call for a naming rule.

In the embodiment of the present disclosure, the first thing that needs to be considered after a shot is naming the photos. The photo names cannot be repeated. Different naming rules may be used for different devices. Naming based on time is a common approach. In fact, naming photos based on time is just the approach adopted in the ANDROID system. What else does the user care and want to record except for time? The embodiment of the present disclosure will find the answer from the calendar information. That is, the calendar information is called next for acquiring a useful information corresponding to the current time.

In the presence of inputs of the calendar information (calendar module), the names for the photos taken by a camera can be designed to conform with the user's habit according to the user's customized needs.

Step S400—receiving an operational instruction from the user to select a corresponding category sub-menu to browse the photos by category in viewing the photos.

For example, in viewing the photos, an operational instruction is received from the user to select the to-be-viewed photos taken on a certain day, in a certain weather, or of a certain travel. A regular expression may be used for pattern match. Matched photos are automatically displayed; otherwise, unmatched photos are not shown.

Namely, in the embodiment of the present disclosure, after the photos are taken by a user, the taken photos are browsed by category according to one's personal preferences in viewing the photos. The classification is based on time. It can also be based on an event such as a meeting, a travel, a party, and so on. The photos can also be browsed based on the weather such as a cloudy day.

As can be seen from above, the present disclosure provides a method for automatically naming the currently taken photos according to the calendar information. Such a method is a quick way and is reliable, and provides convenience for the user.

Figure 2:
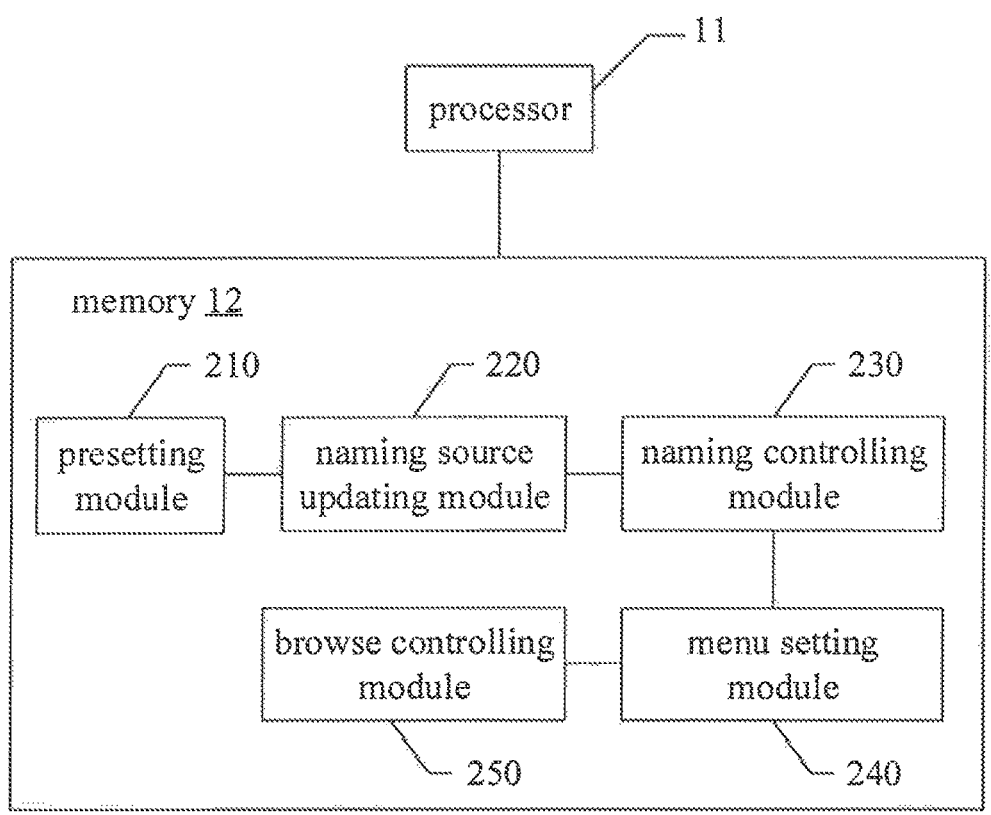
FIG. 2 is a functional block diagram showing a system for automatically naming photos based on a mobile terminal in accordance with a preferred embodiment of the present disclosure.

Based on above method embodiment, the present disclosure provides an embodiment of a system for automatically naming photos based on a mobile terminal. The system may include a processor 11 and a memory 12. The memory 12 is used for storing instructions. The processor 11 is coupled to the memory 12, and is used to execute the instructions stored inside the memory 12. All of the modules 210, 220, 230, 240, and 250, and other modules or units as introduced below, are instructions executable by the processor 11 to perform corresponding functions. As shown in FIG. 2, the system includes the follows.

A presetting module 210 is configured to preset a photo naming rule and storing the photo naming rule in the mobile terminal. Please refer to above context for details.

A naming resource updating module 220 is configured to update, in real-time every day, calendar information of a resource provided in the mobile terminal for naming the photos. Please refer to above context for details.

A naming controlling module 230 is configured to search for a naming resource corresponding to a current time from the calendar information when a new photo is detected to be stored, automatically name the new photo according to a preset naming rule, and store the named photo in a specific category. Please refer to above context for details.

A menu setting module 240 is configured to preset an operational menu on the mobile terminal used to browse the stored photos by category. The operational menu with a category view includes a time category sub-menu categorized according to time, an event category sub-menu categorized according to events, and a weather category sub-menu categorized according to the weather. Please refer to above context for details.

A browsing controlling module 250 is configured to receive an operational instruction from the user to select a corresponding category sub-menu to browse the photos by category in viewing the photos. Please refer to above context for details.

Furthermore, the system for automatically naming photos based on a mobile terminal further includes the follows.

A resolving module is configured to resolve a short message or email information received by the mobile terminal. For an email or message in a specific format, it is resolved in a specific manner so as to obtain a useful resource for the naming, which is then automatically synchronized with the calendar information. Please refer to above context for details.

A selecting and pattern matching module is configured to receive an operational instruction from the user in viewing the photos to select the to-be-viewed photos taken on a certain day, in a certain weather, or of a certain travel. A regular expression may be used for pattern match. Matched photos are automatically displayed. Please refer to above context for details.

The resource for naming the photos may include time information, work content information, life category information, and/or weather information. Please refer to above context for details.

In addition, the present disclosure provides a mobile terminal in supporting the system and method for automatically naming photos as described above.

Figure 3:
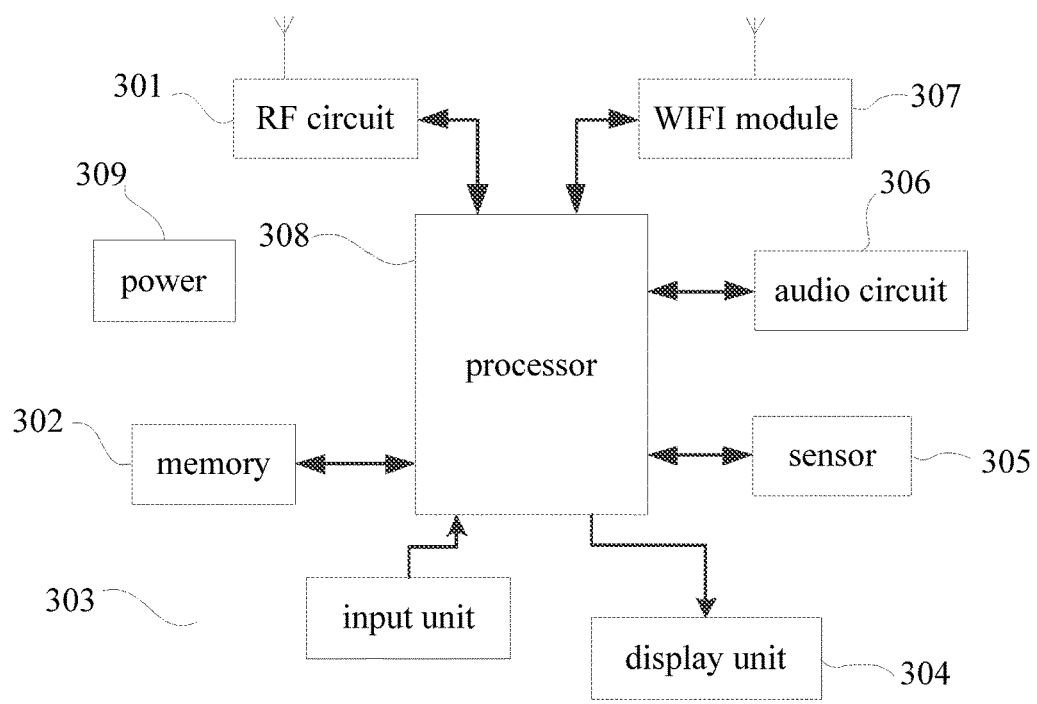
FIG. 3 is a schematic diagram showing a mobile terminal in accordance with the present disclosure.

As shown in FIG. 3, the mobile terminal may include a Radio Frequency (RF) circuit 301, a memory 302 including one or more computer readable media, an input unit 303, a display unit 304, a sensor 305, an audio circuit 306, a WIFI (Wireless Fidelity) module 307, a processor 308 including one or more processing cores, a power 309, and so on. It can be understood for a person skilled in the art that the terminal structure shown in FIG. 3 does not place any restriction to the terminal. The terminal may include components more or less than that shown in the drawings, or have some components assembled together, or have different deployments.

Of course, it can be understood for a person skilled in the art that all or a part of the processes described in above method embodiments can be carried out by computer instructions to instruct related hardware (e.g., a processor and a controller) to achieve the processes. The instructions may be stored in a computer readable media. When executed, the instructions may include the processes described in above method embodiments. The aforesaid media can be a memory, a hard disk, or an optical disk.

The method for automatically naming photos based on a mobile terminal, the system, and the mobile terminal provided in the present disclosure add a new function for the mobile terminal. Currently taken photos may be automatically named according to calendar information of a device. The mobile terminal of the present disclosure can carry out automatic classification of photos in the beginning the photos are taken, and carry out recording sufficient and abundant information. The naming and classification are automatically carried out without the need of excessive human operation. The mobile terminal is simple in operation, is easy to be carried out, and provides convenience for the user.

It should be understood that the applications of the present invention are not limited to the above-described examples. For those of ordinary skill in the art, improvements or modifications may be made according to above descriptions, but all such improvements and modifications should be within the scope of the appended claims.

What is claimed is:

1. A method for automatically naming photos in a mobile terminal, comprising steps of:
 (a0) presetting an operational menu on the mobile terminal, to browse stored photos on the mobile terminal by category;
 (a1) presetting a photo naming rule and storing the same, wherein the photo naming rule comprises time, events, and/or weather or their combinations, wherein the operational menu provides a category view and comprises at least one of a time category sub-menu categorized according to time, an event category sub-menu categorized according to events, and a weather category sub-menu categorized according to weather;
 (a) updating, in real-time, calendar information providing a naming resource;
 (b) searching for the naming resource corresponding to a current time from the updated calendar information in response to detecting a new photo to be stored in the mobile terminal;
 (c) automatically naming, according to a preset naming rule, the new photo using information obtained from the naming resource;
 (d) storing the named new photo;
 (e) receiving an operational instruction to select a corresponding category sub-menu, to browse the stored photos by category in viewing the stored photos to select to-be-viewed photos taken on a certain day, in a certain weather, or of a certain travel;
 (f) using a regular expression for pattern match in searching for the to-be-viewed photos after receiving the operational instruction; and
 (g) automatically displaying matched photos in response to a result from the regular expression.

2. The method according to claim 1, wherein the information obtained from the naming resource comprises at least one of time information, work content information, life category information, and weather information.

3. The method according to claim 1, wherein step (a) comprises steps of:
 resolving a data segment constructed in a specific format from the naming resource;
 obtaining specific information from the resolved data segment; and
 automatically synchronizing the obtained specific information to the calendar information.

4. A system for automatically naming photos in a mobile terminal, comprising:
 a processor; and
 a memory connected with processor, the memory comprising a plurality of program instructions executable by the processor, the plurality of program instructions comprising:
 (a0) presetting an operational menu on the mobile terminal, to browse stored photos on the mobile terminal by category;
 (a1) presetting a photo naming rule and storing the same, wherein the photo naming rule comprises time, events, and/or weather or their combinations, wherein the operational menu provides a category view and comprises at least one of a time category sub-menu categorized according to time, an event category sub-menu categorized according to events, and a weather category sub-menu categorized according to weather;
 (a) updating, in real-time, calendar information providing a naming resource;
 (b) searching for the naming resource corresponding to a current time from the updated calendar information in response to detecting a new photo to be stored in the mobile terminal;
 (c) automatically naming, according to a preset naming rule, the new photo using an information obtained from the naming resource;
 (d) storing the named new photo;
 (e) receiving an operational instruction to select a corresponding category sub-menu, to browse the stored photos by category in viewing the stored photos to select to-be-viewed photos taken on a certain day, in a certain weather, or of a certain travel;
 (f) using a regular expression for pattern match in searching for the to-be-viewed photos after receiving the operational instruction; and
 (g) automatically displaying matched photos in response to a result from the regular expression.

5. The system according to claim 4, wherein instruction (a) comprises:
 resolving a data segment constructed in a specific format from the naming resource;
 obtaining a specific information from the resolved data segment; and
 automatically synchronizing the obtained specific information to the calendar information.

6. The system according to claim 4, wherein the information obtained from the naming resource comprises at least one of time information, work content information, life category information, and/or weather information.

7. A method for automatically naming photos in a mobile terminal, comprising steps of:

presetting an operational menu on the mobile terminal, to browse stored photos on the mobile terminal by category;

presetting a photo naming rule and storing the same, wherein the photo naming rule comprises time, events, and/or weather or their combinations, wherein the operational menu provides a category view and comprises at least one of a time category sub-menu categorized according to time, an event category sub-menu categorized according to events, and a weather category sub-menu categorized according to weather;

resolving a format of a data segment obtained from a naming resource;

obtaining specific information from the data segment after the resolving step;

synchronizing, in real-time, the obtained specific information to calendar information;

obtaining information from the synchronized calendar information according to a user settings in response to detecting a new photo to be stored in the mobile terminal;

automatically naming the new photo using the information obtained from the synchronized calendar information;

storing the named new photo in the mobile terminal;

receiving an operational instruction to select a corresponding category sub-menu, to browse the stored photos by category in viewing the stored photos to select to-be-viewed photos taken on a certain day, in a certain weather, or of a certain travel;

using a regular expression for pattern match in searching for the to-be-viewed photos after receiving the operational instruction; and automatically displaying matched photos in response to a result from the regular expression.

8. The method according to claim 7, wherein the information obtained from the synchronized calendar information comprises at least one of time information, work content information, life category information, and weather information.

\* \* \* \* \*